No. 674,201. Patented May 14, 1901.
F. J. ENGLEN.
FILLING AND WEIGHING APPARATUS.
(Application filed Sept. 4, 1900.)
(No Model.) 4 Sheets—Sheet 1.
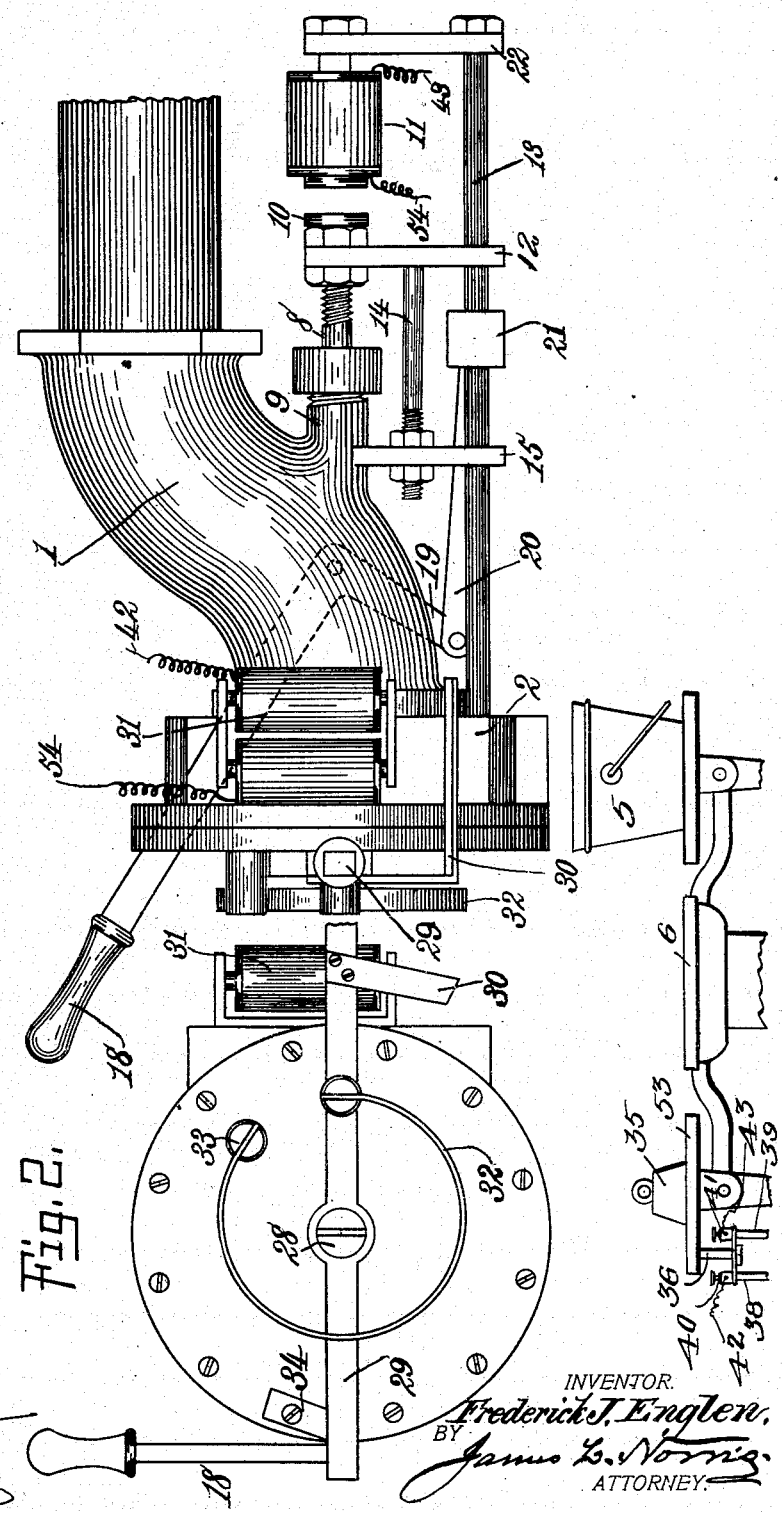
WITNESSES:
INVENTOR.
Frederick J. Englen,
BY James L. Norris.
ATTORNEY.

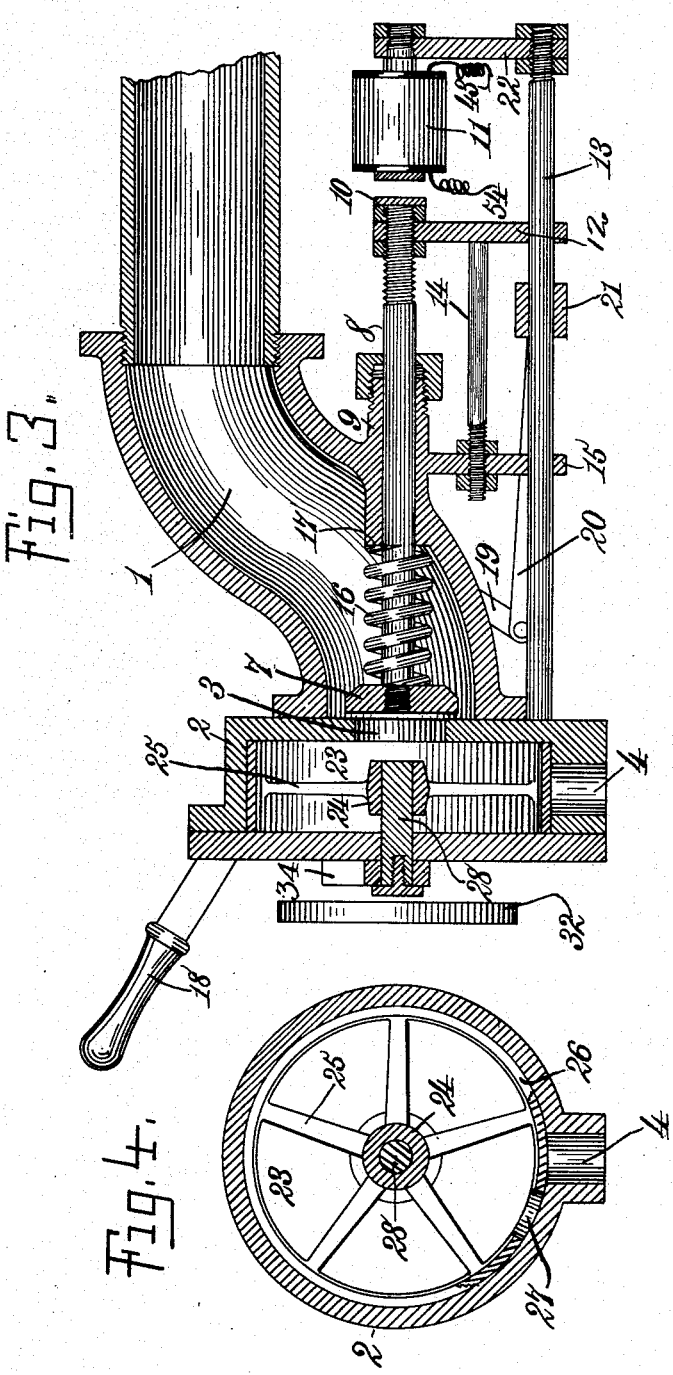

No. 674,201. Patented May 14, 1901.
F. J. ENGLEN.
FILLING AND WEIGHING APPARATUS.
(Application filed Sept. 4, 1900.)
(No Model.) 4 Sheets—Sheet 3.
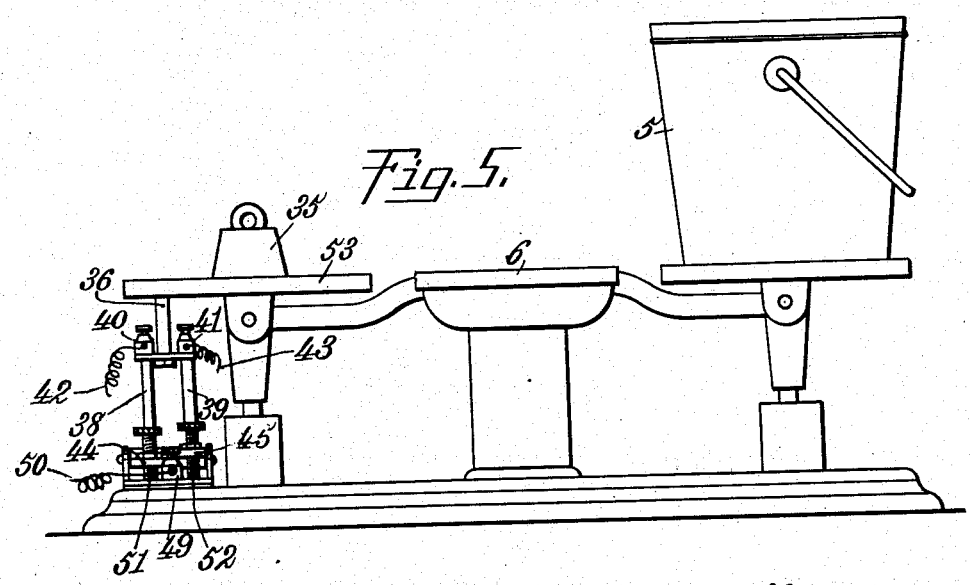
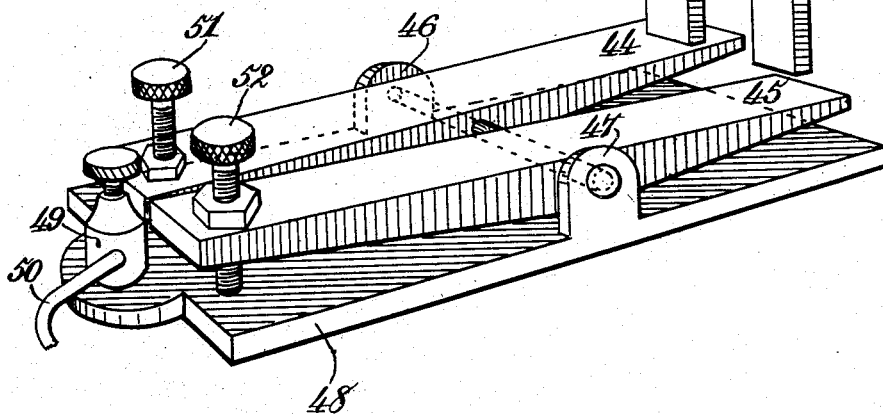
WITNESSES:
INVENTOR.
Frederick J. Englen.
BY James L. Norris.
ATTORNEY.
THE NORRIS PETERS CO., PHOTO-LITHO., WASHINGTON, D. C.

No. 674,201. Patented May 14, 1901.
F. J. ENGLEN.
FILLING AND WEIGHING APPARATUS.
(Application filed Sept. 4, 1900.)
(No Model.) 4 Sheets—Sheet 4.
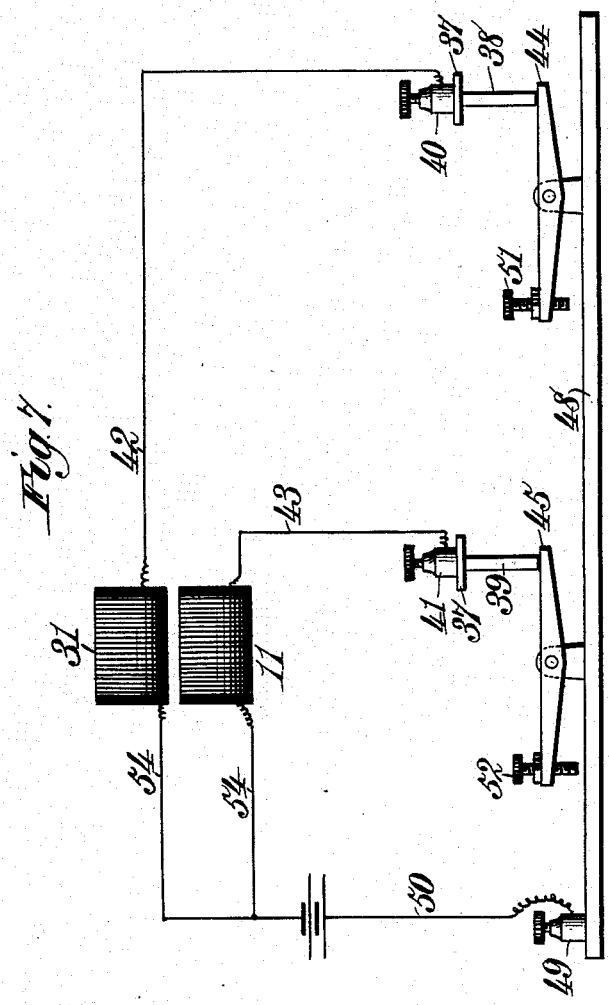
Witnesses
Robert Everett
Inventor
Frederick J. Englen.
By James L. Norris.
Atty.

UNITED STATES PATENT OFFICE.

FREDERICK J. ENGLEN, OF OMAHA, NEBRASKA, ASSIGNOR OF ONE-HALF TO DANIEL CAMERON, OF SAME PLACE.

FILLING AND WEIGHING APPARATUS.

SPECIFICATION forming part of Letters Patent No. 674,201, dated May 14, 1901.

Application filed September 4, 1900. Serial No. 29,003. (No model.)

*To all whom it may concern:*

Be it known that I, FREDERICK J. ENGLEN, a citizen of the United States, residing at Omaha, in the county of Douglas and State of Nebraska, have invented new and useful Improvements in Filling and Weighing Apparatus, of which the following is a specification.

My invention relates to filling and weighing apparatus, one object of the same being to provide an apparatus whereby such commodities as lard, jellies, syrup, and the like may be introduced into packing and shipping vessels in certain predetermined quantities.

A further object of the invention is to provide electrically-actuated means for maintaining the passage from the storage-compartment containing the commodity to the receptacle on the scale-beam open during the weighing operation and means thrown into operation by the scale-beam for automatically releasing said electrically-actuated means and cutting off said passage.

A further object of the invention is to provide novel means for partially cutting off or reducing the flow of the commodity to the receptacle being filled toward the end of the weighing operation and afterward checking said flow entirely.

Other objects and advantages of the invention will hereinafter appear, and the novel features thereof will be set forth in the claims.

In the drawings forming part of this specification, Figure 1 is a side elevation of the filling mechanism. Fig. 2 is an end view of the same. Fig. 3 is a longitudinal section of the filling mechanism. Fig. 4 is a cross-section through the chamber communicating with one end of the supply-pipe. Fig. 5 is an elevation of the scale-beam, showing the connection between one end thereof and the circuit-controlling devices. Fig. 6 is a detail perspective view, on an enlarged scale, of the circuit-controller. Fig. 7 is a diagrammatic view showing the circuit connections through the retaining-magnets for the valves and the circuit-controller.

Like reference-numerals indicate like parts in the different views.

The pipe or conduit 1 leads from the storage tank or vessel containing the commodity to be weighed and communicates at its lower end with a compartment or chamber 2 through a passage 3. The chamber 2 is cylindrical in form and is provided with a discharge-orifice 4, located directly above the vessel or receptacle 5 on the scale-beam 6. The passage 3 between the conduit 1 and the chamber 2 is controlled by a regulating-valve 7, whose stem 8 extends out through a boss 9, formed on the conduit 1 or an extension thereof, the end of said stem 8 being provided with an armature 10 for the electromagnet 11. Secured to the valve-stem 8 adjacent to the armature 10 and projecting laterally therefrom is an arm 12, whose outer end embraces a stationary guide-rod 13. The said arm 12 is adjustably mounted on the stem 8 and is adapted to engage a stop 14 in the form of a rod or bar adjustably secured to a bracket-arm 15, projecting laterally from the boss 9. By reason of the adjustment of the arm 12 and stop 14 the extent of inward movement of the valve 7 may be accurately controlled. The said valve is normally maintained at a point adjacent to the passage 3 by means of a coiled spring 16, surrounding the stem 8 and engaging the valve 7 at one end and a shoulder 17 within the conduit 1 at the other end. The inward movement of said valve 7 is limited by the engagement of the arm 12 with the stop 14, and by adjusting either said arm 12 on the stem 8 or the stop 14 on the bracket-arm 15 said valve may be normally maintained in a slightly-open position or in a position entirely closing the passage 3. To open the valve 7, an operating-lever 18 is provided, the same being fulcrumed, as shown in dotted lines in Fig. 1 of the drawings, upon one side of the conduit 1 and having a lateral extension 19 thereon, which is pivoted to one end of a link 20, connected at its other end to a sleeve or collar 21, slidingly mounted on a guide-rod 13. By depressing the free end of the lever 18 it will be obvious that through the connections described the sleeve or collar 21 will be forced outwardly until it is brought into engagement with the arm 12 on the valve-stem 8, when the further downward movement of said lever will force said arm 12, the stem 8, and the valve 7 outwardly until the armature 10 of the magnet 11 is brought within the field of force of said magnet. Through electrical connections, to be described later, the circuit through the magnet 11 is normally closed, so that when the armature 10 is moved to the position described it will be held in such position through the action of the magnet 11. The said magnet 11 is mounted upon a bracket 22, secured to one end of the stationary guide-rod 13.

The discharge-orifice 4 in the chamber 2 is controlled by a rotary cut-off valve 23, consisting of a central hub 24, radial spokes 25, and an outer circular rim 26. The said rim 26 is provided with an opening 27, adapted to register with the discharge-orifice 4 of the chamber 2, and the periphery of the rim 26 lies in close contact at all points with the inner surface of the chamber 2. It will be obvious that when the opening 27 lies opposite the discharge-orifice 4 and the valve 7 is open the commodity to be weighed is free to pass from the pipe or conduit 1 into the receptacle 5, over which the discharge-orifice 4 is located. When, however, the opening 27 is out of line with the discharge-orifice 4, as shown in Fig. 4 of the drawings, the flow of material into the receptacle 5 is entirely cut off. It will also be obvious that by the construction described the rotary cut-off 23 is perfectly balanced and will operate equally well with any degree of pressure behind it.

Secured to the hub 24 of the cut-off 23 is a central shaft 28, the same extending out through the head of the chamber 2 opposite the passage 3, leading thereinto. To the projecting end of the shaft 28 is secured an operating rod or arm 29, lying parallel to the head of the chamber 2 and projecting outwardly in opposite directions beyond the periphery of said chamber. One of the ends of said rod 29 lies within the path of movement of and is adapted to be engaged by the lever 18 when the latter is depressed. The other end of the rod 29 has secured to it an L-shaped bracket 30, constituting the armature of an electromagnet 31. Between the point of attachment of the bracket 30 to the arm 29 and the pivotal point of said arm is attached a curved spring 32, the other end of said spring being secured to a lug or projection 33 on the head of the chamber 2. The normal position of the opening 27 in the rim 26 of the cut-off 23 is as shown in Fig. 4 of the drawings—that is, at a point removed from the discharge-orifice 4 of the chamber 2—and the normal position of the rod 29, which is secured to the cut-off 23, is as shown in Fig. 2 of the drawings—that is, located so that the armature 30, attached thereto, is removed from the field of force of the magnet 31. The said rod 29 is maintained in this position through the action of the spring 32, which throws said rod around into contact with a stop 34. Upon the downward movement of the lever 18, however, said lever is brought into engagement with one end of the rod 29 and rocks said rod and the shaft 28 and cut-off 23, connected therewith, until the opening 27 in said cut-off reaches a point opposite the discharge-orifice 4 in the chamber 2 and the armature 30 on the end of said rod comes within the field of force of the magnet 31. The said magnet 31 is in a normally-closed circuit, to be described later, and therefore acts to maintain the cut-off 23 in its open position against the action of the spring 32.

The scale-beam 6, as heretofore stated, has the receptacle to be filled on one end thereof, while on the other end thereof is placed a counterpoise or weight 35. Secured to the end of the beam 6 on which the counterpoise 35 is located is a depending rod or bar 36, having a cross-head 37 secured thereto, which cross-head carries two depending bars 38 39, as shown most clearly in Fig. 6 of the drawings. Also connected to the cross-head 37 above the bars 38 39 are the binding-posts 40 and 41, to which are respectively attached the conductors 42 and 43. The lower ends of the bars 38 and 39 are adapted to engage, respectively, oscillating conducting-levers 44 45, fulcrumed upon the ears 46 47 of a base-plate 48, having a binding-post 49 at one end, to which is attached a wire or conductor 50. The ends of the conducting-levers 44 and 45 are provided with adjusting-screws 51 52, which serve also as weights for the ends of the levers in which they are mounted. It will be obvious that by means of the adjusting-screws 51 and 52 the positions of said levers may be changed—that is, the ends of said levers may be raised or lowered. As a matter of fact the said adjusting-screws are so turned that the end of the lever 45 containing the adjusting-screw 52 is elevated somewhat, causing the opposite end of the said lever to be slightly depressed. The result of this construction is that upon the upward movement of the end 53 of the scale-beam 6 the bar 39 will leave or separate from the lever 45 before the bar 38 leaves or separates from the lever 44.

The circuits through the coils of the magnets 11 and 31, as heretofore stated, are normally closed. These circuits are arranged in multiple arc, including in one case the positive wire 54 from a source of electrical energy, coil of magnet 11, wire or conductor 43, leading from the magnet 11 to the binding-post 41 on the cross-head 37, bar 39, conducting-lever 45, base-plate 48, binding-post 49, and negative or return wire 50 to source, and in the other case including the positive wire 54 from the source of electrical energy to coil of magnet 31 and wire 42 from the magnet 31 to binding-post 40 on the cross-head 37, thence through bar 38, conducting-lever 44, base-plate 48, binding-post 49, and negative or return conductor 50 to source of electrical energy. When it is stated that the circuits through the magnets 11 and 31 are normally closed, it is of course understood that the end 53 of the scale-beam 6 is depressed through the action of the weight 35 and the bars 38 and 39 are in electrical contact with the conducting-levers 44 and 45.

The operation of the device is as follows: Assuming that the discharge-orifice 4 of the filling mechanism is located directly over the receptacle 5 on one end of the scale-beam and that the weight 35 depresses the other end of the scale-beam, so as to hold the bars 38 and 39 down in contact with the conducting-levers 44 and 45, with the operating-lever 18 raised, as shown in Figs. 1 and 3 of the drawings, the opening 27 in the cut-off 23 will be out of line with the discharge-orifice 4 in the chamber 2, and the flow of the commodity to be introduced into the receptacle 5 and weighed will be cut off. The operating-lever 18 is then depressed, which action, through the link 20, forces outwardly the sleeve or collar 21 until the latter comes into engagement with the arm 12 on the valve-stem 8. Further downward movement of the lever 18 moves the valve-stem 8 and the valve 7, connected therewith, outwardly until the armature 10 comes within the field of force of the magnet 11. The passage 3 leading into the chamber 2, is now wide open, the valve 7 is held in its open position by the action of the magnet 11 on the armature 10, and the commodity from its source of supply is permitted to pass through the conduit 1 and the passage 3 into the chamber 2. The discharge-orifice 4 from the chamber 2 is in the meantime closed. By still further depressing the operating-lever 18, however, the same is brought into engagement with one of the projecting ends of the rod 29 on the shaft 28, and the latter shaft, with the cut-off 23, connected thereto, is turned through the arc of a circle until the armature 30 is brought within the field of force of the magnet 31. The said armature and the parts connected thereto are maintained in this position by said magnet against the action of the spring 32. The armature 30 is so proportioned and arranged on the bar 29 that when it lies against the poles of the magnet 31 the opening 27 in the rim 26 of the cut-off 23 will lie directly opposite the discharge-orifice 4 of the chamber 2. The material to be weighed may now pass in a comparatively large stream from its source of supply through the conduit 1, passage 3, chamber 2, and discharge-orifice 4 into the receptacle 5 to be filled. This large stream provides for quickly filling the receptacle 5. When, however, the end of the scale-beam 6, on which the receptacle 5 is placed, descends through the weight of the material in said receptacle, the opposite end 53 of said scale-beam rises, with the result that the bar 39 moves away from the conducting-lever 45, breaking the circuit through the magnet 11 and deënergizing the same. As soon as the magnet 11 becomes inactive by breaking the circuit through the coils thereof in the manner described the spring 16 serves to restore the valve 7 to its normal position in front of the passage 3 into the chamber 2. The stop 14, however, or the arm 12, which engages said stop, is so adjusted that the valve 7 will not entirely cut off the flow of the material being weighed from the conduit 1 to the chamber 2, but will permit of a greatly-reduced stream to flow into said chamber. The first effect, therefore, of the fall of the receptacle 5 is to reduce but not entirely cut off the flow of material into said receptacle. With the reduced stream now flowing into the receptacle 5 the same becomes slowly filled toward the end of the weighing operation, which permits of greater accuracy than could be obtained if the large stream were maintained throughout. With a small stream flowing into the receptacle 5, however, throughout the entire weighing operation the said operation would be effected very slowly. By my construction, however, a high speed of filling is maintained without destroying the accuracy of the weighing. When the weight 35 is completely overbalanced by the receptacle 5 and the material contained therein, the end 53 of the scale-beam 6 is raised to its highest point, removing or disconnecting the bar 38 from the conducting-lever 44. The circuit through the magnet 31 is now broken, and through the action of the spring 32 the armature 30 is moved away from the poles of the magnet 31 and the cut-off 23 is returned to its normal position, (shown in Fig. 4 of the drawings,) entirely cutting off the flow of the material through the discharge-orifice 4. It will be seen, therefore, that after the lever 18 has been actuated the remaining portion of the weighing and filling operation is entirely automatic.

Having now described my invention, what I claim as new, and desire to secure by Letters Patent, is—

1. The combination with filling mechanism, of a rotary cut-off valve for controlling the discharge-orifice of said filling mechanism and weighing mechanism, a laterally-extending arm secured to the shaft or axis on which said valve is mounted, a regulating-valve in advance of said cut-off valve, an operating-lever for opening said valves, the said lever being connected with said regulating-valve and adapted to engage the arm connected with said cut-off valve, electromagnets for holding said valves in their open positions, and means thrown into operation by said weighing mechanism for deënergizing said magnets.

2. The combination with filling mechanism and weighing mechanism, of a cylindrical chamber at the discharge end of said filling mechanism having a discharge-orifice in the cylindrical wall thereof and an inlet-orifice in one of the heads thereof, a rotary cut-off valve in said chamber comprising a central shaft extending through one of the heads of said chamber, a circular rim whose outer surface lies in close contact with the inner surface of said chamber and which has an opening therein adapted to register with said discharge-orifice, a laterally-extending arm secured to said shaft and projecting beyond the periphery of said chamber, a curved spring connected with said arm for normally maintaining said cut-off valve in its closing position, a regulating-valve for controlling the passage through said inlet-orifice, an arm on the stem of said regulating-valve, a stop adapted to be engaged by said arm, a spring acting upon said regulating-valve for normally maintaining said arm in contact with said stop, an operating-lever for opening said valves, a link pivoted thereto, and a collar attached to said link and adapted to engage the arm on the stem of said regulating-valve, the said lever being adapted to engage the laterally-extending arm on the shaft of said cut-off valve, as and for the purpose set forth.

3. The combination with filling mechanism having a normally closed discharge-orifice, and weighing mechanism, of a rotary cut-off valve controlling the passage through said discharge-orifice, a regulating-valve in advance of said cut-off valve for controlling the flow of material thereto, a lever acting upon said cut-off and regulating valves for opening the same, and means thrown into operation by said weighing mechanism for closing said regulating-valve toward the end of the weighing operation and for closing said cut-off valve when the weighing operation is complete.

4. The combination with filling mechanism having a normally closed discharge-orifice, and weighing mechanism, of a rotary cut-off valve for controlling the passage through said discharge-orifice, a regulating-valve in advance of said cut-off valve for controlling the flow of material thereto, a lever acting upon said regulating and cut-off valves for opening the same, magnets for maintaining said valves in their open positions, and means thrown into operation by said weighing mechanism for first deënergizing the retaining-magnet for said regulating-valve toward the end of the weighing operation and afterward deënergizing the retaining-magnet for said cut-off valve at the end of the weighing operation.

5. The combination with filling mechanism having a normally closed discharge-orifice, and weighing mechanism, of a rotary cut-off valve controlling the passage through said discharge-orifice, a regulating-valve in advance of said cut-off valve for controlling the flow of material thereto, an electromagnet in a normally closed circuit, an armature therefor connected with said regulating-valve, an operating-lever acting upon said regulating and cut-off valves for opening them, and means thrown into operation by said weighing mechanism for deënergizing said magnet toward the end of the weighing operation and for returning said cut-off valve to its closed position at the end of the weighing operation.

6. The combination with filling mechanism having a normally closed discharge-orifice, and weighing mechanism, of a rotary cut-off valve controlling the passage through said discharge-orifice, a reciprocating regulating-valve in advance of said cut-off valve for controlling the flow of material thereto, an operating-lever acting upon said regulating and cut-off valves for opening them, electromagnets for retaining said valves in their open positions, the coils of said magnets being in normally closed electric circuits, springs for returning said valves to their normal positions, and means thrown into operation by said weighing mechanism for first breaking the circuit through the coil of the retaining-magnet for said regulating-valve and afterward breaking the circuit through the coil of the retaining-magnet for said cut-off valve.

7. The combination with filling mechanism having a normally closed discharge-orifice, and weighing mechanism, of a cut-off valve controlling the passage through said discharge-orifice, an arm thereon, a spring for maintaining said cut-off valve in its normally closed position, a regulating-valve in advance of said cut-off valve for controlling the flow of material thereto, a spring for holding said regulating-valve in its normal position, an arm on the stem of the regulating-valve, a stop adapted to be engaged by said arm, an operating-lever having a link connection with the arm on the stem of said regulating-valve whereby said regulating-valve may be opened by said lever, the said lever being further adapted to engage the arm on said cut-off valve for opening it, electromagnets for retaining said regulating and cut-off valves in their open positions, the armature of one of said magnets being secured to the stem of the regulating-valve and the armature of the other of said magnets being secured to the arm on said cut-off valve, and means thrown into operation by said weighing mechanism for first deënergizing the retaining-magnet for said regulating-valve and afterward deënergizing the retaining-magnet for said cut-off valve.

8. The combination with filling mechanism having a normally closed discharge-orifice and a scale-beam having the receptacle to be filled on one end thereof, and a counterpoise or weight on the other end thereof which maintains said end normally depressed, of a cut-off valve for controlling the passage through said discharge-orifice, a regulating-valve in advance of said cut-off valve for controlling the flow of material thereto, means for opening said regulating and cut-off valves, electromagnets for retaining said valves in their open positions, conducting-bars connected with the end of said scale-beam containing said counterpoise and depending therefrom, a pair of conducting-levers, an adjustable contact-screw serving as a counterweight upon one end of each of said levers for maintaining the opposite ends thereof at different levels, a conducting base-plate upon which said conducting-levers are fulcrumed, an electric circuit through the coil of one of said magnets and through one of said bars on said scale-beam and one of said levers and an electric circuit through the other of said magnets and through the other bar on said scale-beam and the other of said levers, as and for the purpose set forth.

9. The combination with filling mechanism, a cut-off valve controlling the discharge-orifice of said filling mechanism, a regulating-valve in advance of said cut-off valve, and electromagnets for holding said valves in their open positions, of a scale-beam having the receptacle to be filled on one end thereof and a counter poise or weight on the other end thereof which maintains said end normally depressed, conducting-bars connected with the end of said scale-beam on which said counterpoise is mounted, conducting-levers adapted to be engaged by said bars when said scale-beam is in its normal position, an electric circuit including the coil of one of said magnets and one of said bars and levers, and an electric circuit including the coil of the other of said magnets and the other of said bars and levers, the ends of said levers which are engaged by said bars lying in different planes when said bars are elevated, whereby the circuit through the retaining-magnet for said regulating-valve will be broken before the circuit through the retaining-magnet for said cut-off valve is broken.

In testimony whereof I have hereunto set my hand in presence of two subscribing witnesses.

FREDERICK J. ENGLEN.

Witnesses:
M. L. SEARS,
E. M. BADGEROW.